United States Patent Office 3,192,417
Patented June 29, 1965

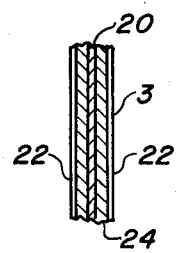
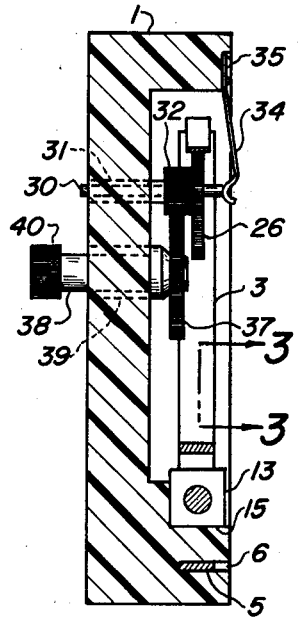
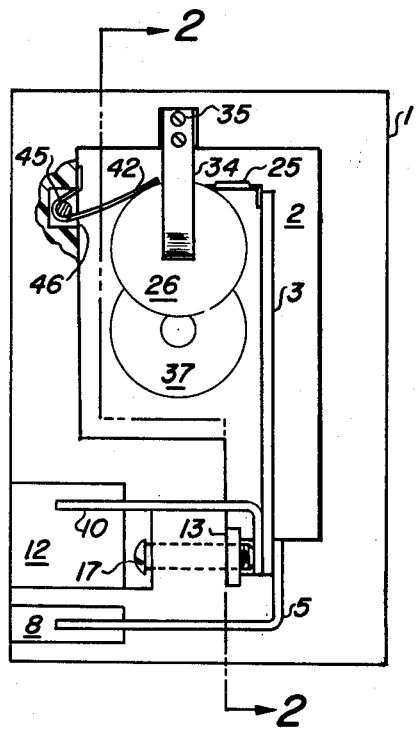

3,192,417
SYNCHRONOUS ELECTRIC MOTOR
Werner G. Seck, Canton, and Roland J. Knouff, Massillon, Ohio, assignors to The Hoover Company, North Canton, Ohio, a corporation of Ohio
Filed July 16, 1963, Ser. No. 295,423
3 Claims. (Cl. 310—8.6)

The herein described invention relates to a very small, low powered, inexpensive and simple synchronous electric motor suitable for driving low level loads such as, for example, electric clocks.

It is a principal object of our invention to provide a small size, simple, inexpensive prime mover consisting of a piezoelectric device which is connected directly to the 50 or 60 cycle per second alternating current supply line and is thereby caused to vibrate synchronously with the frequency of the energizing alternating current. The vibrating piezoelectric device operates a fine ratchet and pawl mechanism for converting the 50 or 60 cycle per second vibration thereof to rotary motion which is then applied to a suitable load, such as a clock, through a simple gearing system.

It is a further object of our invention to provide a rotary motor driven by a line energized piezoelectric device which is characterized by extreme simplicity, low cost, high reliability and in which the parts thereof have natural frequencies sufficiently removed from the line frequency to insure that the motor operates synchronously with the frequency of the line current.

Other and further objects and advantages of our invention will become apparent as the description proceeds when taken in connection with the accompanying drawing wherein:

FIG. 1 is a rear elevational view of our piezoelectric motor,

FIG. 2 is a cross section of the motor of FIG. 1 taken along the line 2—2 thereof and looking in the direction of the arrows, and FIG. 3 is a greatly enlarged scale sectional view of a small portion of a typical piezoelectric device utilized to drive the motor shown in FIGS. 1 and 2.

The piezoelectric motor illustrated in the accompanying drawing is shown on a considerably enlarged scale in order to facilitate illustration. The motor herein illustrated utilizes a ratchet, pawl and drag spring mechanism more fully described and claimed in the application of Christian D. Berger Serial No. 295,464 filed July 16, 1963 and entitled "Electro-Thermal Motor."

In the embodiment of the invention illustrated in the accompanying drawing the apparatus is shown mounted in a casing 1 preferably composed of a molded plastic material having a shaped recess generally identified by the reference character 2 in which the operating portions of the motor are supported as will be described hereinafter.

The power transforming element of our motor comprises a bender type piezoelectric device 3 which may be any known form of piezoelectric device such as Rochelle salt, one of the barium titanates or preferably a lead zirconate titanate ceramic compound which is now widely used for phonographic needle pickup devices. The recess 2 of the casing 1 includes a lower extension opening into which the lower end of the piezoelectric element 3 extends. As viewed in FIG. 1 the right-hand side of the lower end of element 3 abuts one leg of an L-shaped conductor bar 5 which is mounted in a generally L-shaped slot 6 formed in the casing 1. The projecting free end of bar 5 is in a recess 8 within the outer perimeter of casing 1. The other face of the lower end of the piezoelectric element 3 abuts one leg of a second L-shaped conductor bar 10 which also projects to the left as viewed in FIG. 1 through a slot in casing 1 similar to slot 6 into an enlarged recess 12. The free end of bar 10 in recess 12 is within the outer perimeter of the casing 1.

A captive nut 13 is partially embraced by a complementally shaped portion 15 of recess 2 which prevents the nut 13 from rotating. An anchoring screw 17 extends through a suitable bore in the casing 1 opening from the recess 12 into the recess 2. The screw 17 is threaded through the captive nut 13 and bears against the left-hand face of the bent end of conductor bar 10 and forces the conductor bars 5 and 10 and the piezoelectric element 3 into pressure contact with each other and forces the right-hand face of the bent end of conductor 5, as viewed in FIG. 1, against a wall of casing 1. This construction provides a single element which rigidly mounts the piezoelectric element 3 and conductor bars 5 and 10 within the casing 1 and simultaneously insures good electrical contact between the opposite faces of the piezoelectric element 3 and the conductor bars 5 and 10 which are the means for conducting energizing current to the piezoelectric element as will be more fully described hereinafter.

The foregoing method of mounting the piezoelectric element 3 and conductor bars 5 and 10 is the best method now known to us. It is, however, part of the subject matter described and claimed in the application of Justice H. Beach Serial No. 295,424 filed July 16, 1963 entitled "Synchronous Motor and Mounting." The piezoelectric element and electrical connections thereto may be made in other manners as, for example, by soldering electrical connections to opposite faces of the element 3 and cementing or bolting the element itself in place in a casing such as casing 1.

Referring specifically to FIG. 3 a small section on an enlarged scale of element 3 is therein illustrated. The piezoelectric element basically comprises a central thin brass strip 20 on opposite faces of which a piezoelectric material 24 such as lead zirconate titanate has been adhered. The outer exposed surfaces of the piezoelectric material 24 are silvered with a silver coating 22 to form an electrical connection to the piezoelectric material. It is the surfaces 22 against which the conductor bars 5 and 10 are firmly pressed by the securing screw 17.

The upper free end of the driving member 3 carries a very small thin metal pawl 25 which may be made of stainless steel and is preferably cemented to one of the silver faces 22. As can be seen in FIG. 1 the major portion of the pawl 25 which is not directly cemented to the member 3 is channel shaped in cross section to lend stiffness thereto. The portion of pawl 25 bent to form the mounting section cemented to element 3 is not channel shaped and is springy to urge the pawl downward slightly as viewed in FIG. 1, against a ratchet wheel 26 to be described hereinafter. The outer end of the pawl is not channel shaped; it is a thin flat plate for engaging in the fine pawl teeth.

The ratchet wheel 26 is press fitted on a fine pin 30 which is journaled in a bearing bushing 31 press fitted into the casing 1. A small spur gear 32 is also press fitted on the shaft 30 and abuts the inner end of bushing 31 to position the gear 32 and ratchet 26 laterally of the housing 1. The outer end of the pin 30 abuts a light spring 34 secured at its opposite end to the housing 1 by means of screws 35. The light spring 34 urges the gear 32 against the end of bushing 31 to maintain the parts in proper transverse position.

The small spur gear 32 meshes with a larger spur gear 37 which is press fitted on a shaft 38 journaled in a bushing 39 which is also press fitted in the casing 1. The outer projecting end of shaft 38 carries a spur gear 40 which will be engaged to drive any suitable light load such as a standard reduction gear train of a clock mechanism.

The peripheral surface of the ratchet wheel 26 is also lightly engaged by a small light leaf spring 42 mounted upon a pin 45 which is pressed into housing 1 to extend across a recess 46 located to the left of the ratchet wheel 26 as viewed in FIG. 1. The function of the spring 45 is to provide a light resistance to the ratchet wheel which is sufficient to bring the same to a dead stop very quickly, almost instantaneously, following each driving stroke of the pawl 25 and to impose sufficient drag on the wheel 26 to prevent reverse rotation thereof during the non-driving stroke of the pawl 25.

As more fully brought out in the above identified application of Christian D. Berger the point of application of the spring 42 should be as close to the point of application of the pawl 25 as physical limitations will reasonably permit and in no event should the angle between the points of contact of these two elements exceed an angle of 90°.

Our device is intended to be operated on standard alternating current household service, normally 60 cycles in the United States and 50 cycles in many other parts of the world. As shown in the drawing the piezoelectric device 3 is in its unenergized static neutral position. When a 60 cycle alternating current is connected to the electrical connectors 5 and 10 the piezoelectric material is stressed 60 times a second to opposite sides of the neutral position. For the purposes of this explanation it will be assumed that the positive excursion of the alternating current will flex the piezoelectric device to the left as viewed in FIG. 1 to impart a driving stroke to the ratchet wheel 26 and that a negative excursion of the alternating current will flex the piezoelectric device to the right as viewed in FIG. 1 to impart a pawl withdrawing stroke to the device.

When the piezoelectric device is energized by 50 or 60 cycle alternating current, as the case may be, it flexes on opposite sides of its neutral position in synchronism with the frequency of the applied energizing current and thus imparts a number of driving strokes to the wheel 26 corresponding to the frequency of the applied current. Each driving stroke of the pawl 25 thus advances the ratchet wheel 26 by the pitch or span of one tooth.

A piezoelectric device of the dual layer lead zirconate titanate type designed to operate at a frequency of 60 cycles will be approximately 21 mils thick of which the center brass strip 20 has a thickness of 4 mils. The width of the piezoelectric device is approximately one-eighth of an inch and its length is one and a quarter inches of which approximately one-eighth inch of the length will be clamped between the electrical connector bars 5 and 10.

Piezoelectric devices may be made in dimensions other than those herein specified which exemplify a practical working form of device which, when excited by 60 cycle, 120 volt alternating current, will provide a total pawl excursion such that the whole motor may be small in size without requiring manufacturing tolerances of unusual rigidity and finesse. Also the specified preferred pawl excursion is such that a large number of teeth may be formed reliably on a small, light, inexpensive, molded wheel. The illustrated ratchet wheel is made of an acetal or amide molded plastic having a mass of less than one gram and a diameter of one-half inch with 250 teeth on its periphery each having a radial depth of about 0.003 inch and a peripheral span or pitch of about 0.006+ inch.

As shown herein the piezoelectric element is a bender type, i.e. it is in the form of an elongated thin strip having the piezoelectric material so oriented that the strip bends transversely to its longitudinal axis when electrically stressed. The piezoelectric device is also of the type having two separated layers of piezoelectric material on opposite sides of a very thin metal strip. This is the preferred form of piezoelectric device for use in our synchronous motor, but it is within the purview of our invention to use the so-called twister type piezoelectric devices to actuate the pawl and to use piezoelectric devices having more or less than two layers of piezoelectric material.

For practical reasons we prefer to use the two layer sandwich bender type piezoelectric drive element because of its economy, availability, relative freedom from thermal distortion and characteristic of moving the pawl in a plane essentially normal to the side faces of the ratchet wheel and to the radius of the wheel at the point of pawl contact.

The dimensional relations above given provide a system in which the piezoelectrical device operates reliably on standard 60 cycle alternating current service producing a pawl excursion of between 0.07 and 0.012 inch; hence, the actual advance of the ratchet wheel 26 amounts to the span of one tooth per cycle of applied alternating current. The foregoing all assumed that the applied energy is nominal 120 volt standard household service; however, if the frequency or voltage differ, differing dimensions of the piezoelectric device will be required in accordance with well-known relationships to give the required excursion with the frequency and voltage on which it is intended to operate.

It is highly important to assure complete synchronism between the drive of the pawl and the applied electrical current that the piezoelectric device, pawl, ratchet wheel, drag spring assembly and the individual parts thereof all have natural frequencies at least 50 percent higher than the frequency of the applied energizing current. The dimensions given satisfy these conditions which also insure that neither the system nor the parts thereof will attempt effectively to vibrate at their resonant frequencies rather than at the frequency of the energizing current.

We have found that piezoelectric drive motors constructed in accordance with the foregoing description operate reliably in perfect synchronism with the energizing alternating voltage over long periods of time and are ideal for operating very low level loads such as electric clocks.

The power of a piezoelectric device as above described is extremely low as is its energy consumption; however, it is sufficient for the purposes described. We have found that the piezoelectric motor herein described operates reliably and satisfactorily to drive a clock mechanism while consuming only a fraction of one watt of energy making it extraordinarily economical in usage.

We claim:
1. A synchronous electric motor comprising a support member, a piezoelectric element having one portion thereof secured to said support member and another unsecured portion which is free to move when said element is electrically stressed, said piezoelectric element comprising a plane body of piezoelectric material having a layer of electrically conductive material secured to opposite faces thereof whereby application of an electrical potential difference between said layers of conductive material will apply an electrical stress to said piezoelectric material causing physical motion of the unsecured portion of said piezoelectric element, a ratchet wheel rotatably mounted on said support member and having ratchet teeth on one surface thereof, a pawl mechanically coupled to the unsecured portion of said piezoelectric element to be reciprocated thereby and drivingly engaged with the ratchet teeth on said wheel, said pawl, piezoelectric element and wheel being so positioned that said pawl moves in a plane substantially normal at the point of pawl contact to a non-tooth bearing surface of the wheel and in a direction to apply a rotating force to an engaged tooth on the wheel, means for applying an alternating potential of predetermined frequency and potential to the said layers of conductive material, means for preventing reverse rotation of said ratchet wheel on the non-driving stroke of said pawl, and said piezoelectric device, pawl and ratchet wheel having dimensions such that the excursion of the pawl is greater than the pitch of one and less than the pitch of two teeth on said ratchet wheel when the piezoelectric device is energized by an alternating potential of said predetermined frequency and potential.

2. Apparatus according to claim 1 wherein said piezoelectric device is a dual layer bender type having an unsecured length of about one and one-eighth inch, a width of about one-eighth inch and a thickness of about twenty-one thousandths of an inch, and exhibits an excursion of between 0.007 and 0.012 inch when energized by 60 cycle, 120 volt alternating current.

3. Apparatus according to claim 1 wherein said piezoelectric device comprises an elongated strip which bends when electrically stressed, said pawl is secured directly to the unsecured end of said piezoelectric device and said means for preventing reverse rotation of said ratchet wheel comprises a light leaf spring frictionally engaging the ratchet teeth on said ratchet wheel with sufficient pressure to arrest motion thereof at the end of each driving stroke of said pawl.

References Cited by the Examiner
UNITED STATES PATENTS 2,800,551    7/57    Crownover _____ 310—8.6
3,057,147    10/62    Hetzel.

OTHER REFERENCES

Piezo-Electricity, pages 673–674, by W. G. Cady, published by McGraw-Hill Company, 1946; Cleveland Public Library, Cat. No. 537.28–203.

MILTON O. HIRSHFIELD, *Primary Examiner.*